Figure 1:
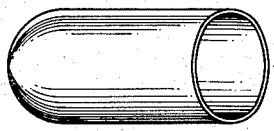

May 23, 1944.    G. D. HIATT ET AL    2,349,430
MEDICAL CAPSULE
Filed May 15, 1941    2 Sheets-Sheet 1

GORDON D. HIATT
JOHN EMERSON
INVENTORS
BY
ATTORNEYS

Patented May 23, 1944

2,349,430

UNITED STATES PATENT OFFICE 2,349,430

MEDICAL CAPSULE

Gordon D. Hiatt and John Emerson, Rochester, N. Y., assignors to Eastman Kodak Company, Rochester, N. Y., a corporation of New Jersey Application May 15, 1941, Serial No. 393,578

9 Claims. (Cl. 167—83)

This invention relates to medical capsules essentially consisting of lower fatty acid esters of cellulose, having an acyl content of 13–20%, and the process for preparing them.

Previously, in the preparation of medical capsules, gelatin has ordinarily been employed therefor. The advantages of gelatin are, 1. It may be handled in water solutions,
2. Gelatin is a film- or skin-forming substance, and
3. The skins or films, prepared therefrom, set or gel in the cast form prior to curing the skin or evaporating off the solvent therefrom.

Gelatin, however, has some disadvantages due to its susceptibility to moisture. For instance, under high humidity conditions, gelatin capsules may stick together or lose their shape or they may be subject to attack by living organisms, such as bacteria or mold.

An object of our invention is to provide medical capsules which are not subject to adverse effects by high humidity conditions or to attack by organisms which attack natural products like gelatin. Another object of our invention is to provide a method of preparing medical capsules, resistant to the affect of humidity and organisms, by means of a solvent consisting of water and an organic solvent. Other objects of our invention will appear herein.

We have found that by dissolving, at an elevated temperature, cellulose acetate or some other lower fatty acid ester of cellulose, the acyl of which is predominantly acetyl, which ester has an acyl content of 13–20% in a mixture of water and sufficient of a water-miscible solvent which will cause insolubilizing of the cellulose ester at ordinary temperature, shaping the hot solution so as to form capsule elements and then cooling the so-formed elements to insolubilize said elements, the resulting products will form capsules similar to gelatin capsules with the added advantages that they are resistant to the effects of high humidity and to attack by bacteria. This is especially valuable in hot countries or in countries which experience high humidity conditions, either seasonably or most of the time.

The solvent mixture for preparing the capsule may employ any inert organic liquid which, in admixture with water will dissolve the cellulose ester at 40–70° C., forming a solution, a coating or skin of which will be insolubilized or set at room temperature. Some of the solvents, which have been found useful in preparing capsules in accordance with our invention, are acetone, ethyl alcohol, normal or isopropyl alcohol, methyl cellosolve, 1–4 dioxane, ethyl methyl ketone and ethyl lactate.

For the making of soft capsules a sheet or skin of the cellulose ester plasticized with at least ½ part of plasticizer is ordinarily formed and in that case even a solvent for the cellulose ester at room temperature may be used, the solution being coated out on to a film-forming surface and the solvent evaporated therefrom.

Figure 2:
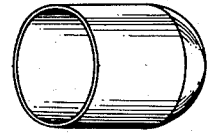
Figure 3:
Figure 4:
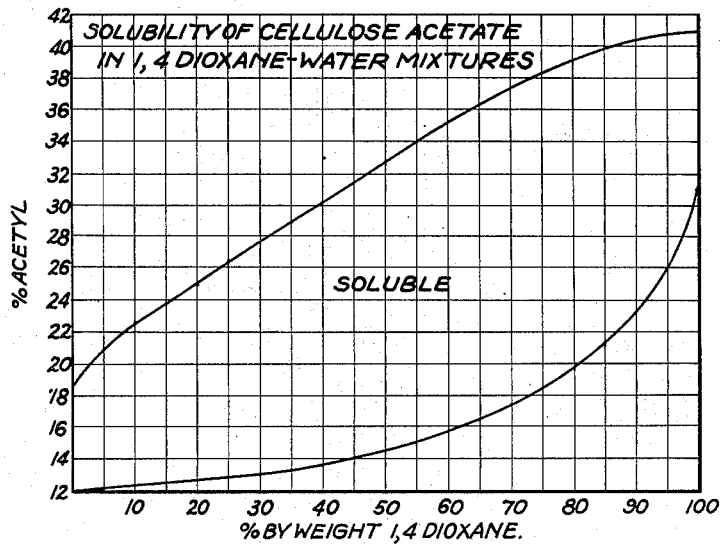
Figure 5:
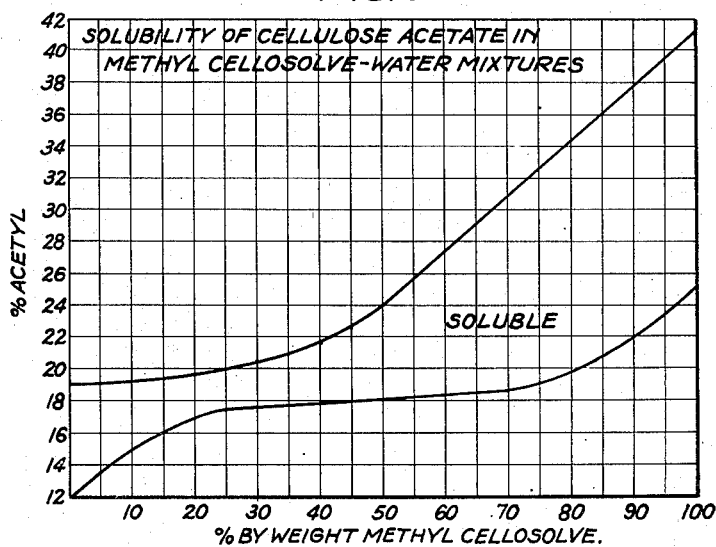

In the drawings, Figures 1 and 2 illustrate capsule elements, while Figure 3 illustrates the completed capsule. Figures 4 and 5 illustrate the solubility of far hydrolyzed cellulose esters in solvent-water mixtures in the case of two of the solvents mentioned. Figures 1, 2 and 3 of the drawings in Crane application Serial No. 366,856, filed November 23, 1940, which issued as Patent No. 2,327,770, Aug. 24, 1943 illustrate the solubility of hydrolyzed cellulose acetate in some of the other solvents mentioned when mixed with water.

It may be seen from the graphs of these drawings that to get a solvent composition which will insolubilize the cellulose ester at ordinary temperatures, a point to the right of the soluble region of the graph should be selected. For illustration, if a cellulose acetate of 16% acetyl is to be used to make medical capsules, dioxane-water containing 70% of dioxane will insolubilize a skin of that ester at room temperature. As this solvent composition will dissolve the ester at 40–70° C., it would, therefore, be suitable for making capsules in accordance with our invention. If the solvent to be employed with that cellulose acetate is methyl cellosolve-water, a methyl cellosolve content of 25% will be satisfactory to give a solvent mixture which will dissolve the ester at 40–70° C., but yet will insolubilize a skin of the solution at room temperature. If the solvent is ethyl alcohol-water, a 40% ethyl alcohol concentration will be satisfactory. As shown by Figure 2 of the Crane application, however, if the cellulose acetate contained 18% acetyl, ethyl alcohol-water containing at least approximately 60% of ethyl alcohol would be used.

Any of the solvents to the right of the solubility area in the various graphs may be employed in our invention up to a point where the cellulose ester would be insoluble at 40°–70° C. in the mixture selected. For instance, using a cellulose acetate of 18½% acetyl content, the highest proportion of acetone, which will give solubility of the ester at 40–70° C., is approximately 65%; ethyl alcohol 75%; normal or isopropyl alcohol 60; methyl cellosolve 90%; 1–4 dioxane 80% and methyl ethyl ketone 45%. As illustrated by the graphs herein and in the Crane application Serial No. 366,856, the tolerance of non-aqueous liquid, as regards solubility, decreases with decreased acetyl so that the highest proportions of the solvents, which will give solubility at 40–70° C., will be lower for the cellulose acetates having lower acetyl contents and vice versa. As pointed out above, however, for the forming of a sheet or film for making soft capsules, solubility at room temperature may be permissible.

In preparing capsule elements in accordance with our invention, it is preferred that the cellulose ester solution be one which sets or gels upon cooling. This assures both better uniformity and good thickness of the skin which is formed in preparing the capsule elements by the usual methods. For gelling to occur, the cellulose ester solution used must not be too thin or there will not be enough cellulose ester present to cause gelling of the skin upon cooling. As a rule, no more than between 6–7 parts of aqueous solvent should be employed per part of ester to obtain gelling and usually it is preferred that no more than 4–5 parts of solvent be used to obtain a good, thick, quick-setting skin. If a low viscosity ester is employed instead of one having medium or high viscosity, it is necessary to increase the concentration of the ester over that which will give gelling with the higher viscosity esters to obtain commensurate setting or gelling. For instance, with a cellulose ester which has a cuprammonium viscosity of its cellulose much below 10 cps., 6 parts of solvent per part of ester may be too high a concentration to give a skin which sets.

For the best gelling compositions, it is usually desirable that the proportion of organic liquid used be less than the maximum for solubility at 40–70° C. For instance, using a cellulose acetate having an acetyl content of 18.5%, a solvent composition consisting of water and 50–65% acetone will give a solution at 40–70° C. However, for a solvent composition giving good gelling characteristics, 50–60% acetone should be used. If methyl cellosolve or 1-4 dioxane were used, the limits for solubility at 40–70° C. correspond to those which will give good gelling when a tube is dipped therein and withdrawn so as to form a skin on the tube.

The cellulose esters, which are employed in our invention, are the lower fatty acid esters of cellulose in which the acyl content is predominately acetyl. These esters should have an acyl content of 13–20%. For instance, cellulose acetates hydrolyzed down to acetyl contents of 12%, 14%, 17% or 19.5% or intermediate acetyl contents or a mixture of those esters may be employed. If desired, instead of a straight acetate, a mixed ester of cellulose, such as cellulose acetate propionate, having a propionyl content of up to 7% and a total acyl content of, for instance, 15%, or some other acyl within the range of 13–20%, may be employed. Instead of an acetate propionate, an acetate butyrate, having a butyryl content of, for instance, up to 6% and an acyl content within the range 13–20% may be used. With the esters having an appreciable amount of propionyl or butyryl (such as over 60% butyryl or 7% propionyl) it is preferred that the esters have an acyl content of 1–3% lower than with a straight acetate used for making capsules in accordance with our invention, although the choice of acyl content will vary with the individual operator.

Our invention also contemplates the use directly of cellulose esters dissolved in mixtures of water and solvents having the acyl content prescribed herein, resulting from the hydrolyzing of a cellulose ester in accordance with the disclosure of Crane application Serial No. 366,856. In that case only an amount of a basic substance should be added to the mass resulting from the Crane hydrolysis process, which is approximately chemically equivalent to the catalyst employed therein. For instance, a cellulose acetate, which has been hydrolyzed to an acetyl content of 16½%, using a mixture of ethyl alcohol and water and sulfuric acid as the catalyst, may be thickened and the sulfuric acid may be neutralized with sodium carbonate, sodium bicarbonate, ammonia, or the like, in an amount chemically equivalent to the sulfuric acid present in the mass. If in this mass the proportions are correct to give a solution of the cellulose ester at 40–70° C., and to insolubilize the cellulose ester at room temperature, the mass is then used directly. If, however, that is not the case, the composition of the mass is adjusted after neutralizing the catalyst and then employed for making capsule elements in the well-known manner, although in making sheets for making soft capsules this is a preference.

Our invention is adapted for the making of soft capsules. For preparing soft capsules plasticizers are incorporated in substantial proportions in the compositions. Soft capsules are ordinarily adapted for containing liquids, commonly fish-liver oils or like liquids which are vitamin sources. The hardness or softness of the capsules prepared in accordance with our invention is dependent upon the amount of plasticizer which is employed in the composition. To get soft capsules ½–4 parts of plasticizer should be incorporated in the cellulose ester per part of ester. It is also desirable to use a small proportion of plasticizer in the compositions used for hard capsules as there is less tendency to crack in skins containing plasticizer. If the amount of plasticizer incorporated in the cellulose ester is 1–25% of the ester, a hard skin or capsule results. Using an amount of plasticizer 25–50% of the cellulose ester produces a moderately hard skin or capsule, while at 50–75% and above, the skin formed is limp and of a somewhat rubbery nature. This is the characteristic desired for the soft capsules. It is preferred to limit the proportion of plasticizer to four parts per part of cellulose ester as a greater proportion of plasticizer tends to exude from the skin over a period. Also, with some plasticizers, large proportions tend to make the skin or capsule tacky and sticky. Obviously where these characteristics are not objectionable proportions of plasticizer greater than four parts per part of cellulose ester may be employed.

The plasticizers which are useful in compositions in accordance with our invention are those which are soluble in solvent mixtures containing 50% or more water, are compatible with the cellulose ester, are chemically stable and have a high enough boiling point that they will not evaporate from the composition on keeping. Some of the plasticizers having the properties listed which may be employed in capsule-forming compositions, in accordance with our invention, are glycerol -$\alpha$-mono-iso-propyl ether, glycerol-$\alpha$-$\alpha'$-dimethyl ether, glyceryl-$\beta$-methyl-$\beta$-phenyl ether, monoacetin, and glycerol, the latter especially with some auxiliary material such as sucrose in the proportion of one part of the sugar to four of glycerol. Other materials, which may be employed as plasticizers for the cellulose esters in making capsules in accordance with our invention are sorbitol, mannitol, pentaerythritol or derivatives of those alcohols. The alcohol derivatives, which contain a low hydroxyl content when used as plasticizer, result in harder, more rigid films or skins than when the alcohols themselves or high hydroxyl content derivatives are employed for plasticizing the cellulose ester. In the making of soft gelatin capsules, it is often the practice to make a pliable sheet of the material, emboss it, fill the indentations with the desired liquid and then press a second sheet of the pliable material thereon to form the other half of the enclosure. Such a procedure is also included in this application under the designation of forming capsule elements.

Instead of using the organic liquids mentioned alone, it might be advantageous in some instances to add an additional organic liquid, usually with a boiling point sufficiently separated from the principal liquid used that some different feature is imparted thereto. For instance, in the making of capsules or elements using ethyl alcohol, it is sometimes advantageous to not only add a polyhydroxy alcohol for plasticizing but also some other alcohol, such as butyl alcohol, to adjust the process as desired.

The following example illustrates our invention:

Example I

One part of a cellulose acetate containing 16.3% of acetyl was dissolved in 5 parts of a solvent mixture of equal parts of water and propyl alcohol at 50–60° C. At this temperature, capsule elements were formed on small, round-ended tubes by dipping the tubes in the solution, withdrawing the tubes and rotating them to keep the coating even. The coating set quickly. The skin was then dried and slipped from the tube to form a half end of a capsule.

Example II

Two parts of cellulose acetate containing 16.5% of acetyl were dissolved in 5 parts of a mixture of propyl alcohol and water containing 55 parts of the former and 45 parts of the latter by volume at 50–60° C. 0.2 part of glycerol were added thereto and capsule elements were formed as in Example I but with an increased flexibility and rate of solubility in water.

Example III

Ten parts of cellulose acetate containing 16.5% of acetyl were dissolved in 100 parts of water. Six grams of sucrose and 9 grams of glycerol were then dissolved therein and a film was cast from the solution. The film was clear, soft and flexible and was useful for the preparation of soft water-soluble capsules.

Example IV

The above example was repeated except that six grams of sucrose and 24 grams of glycerol were added. The film prepared therefrom was soft and flexible with greatly increased stretch and was useful in soft capsule manufacture.

Example V

A 200 gram sample of a 33% acetyl cellulose acetate was heated at 85° C. with 1400 grams of distilled water, 600 grams of ethyl alcohol and 6 grams of 95% sulfuric acid. At the end of 7 hours the catalyst was neutralized with sodium bicarbonate. A purified sample of the cellulose ester obtained analyzed 16% acetyl. Glycerol was added to portions of this dope so that the ratios of glycerol to cellulose acetate were 1:1 and 2:1. Sheets of this material were formed by evaporation of the solvents and were used to form medical capsules.

Example VI

Portions of neutralized dope in Example V were treated with glycerol-$\alpha$-mono-iso-propyl ether and with glycerol-$\alpha\alpha'$-dimethyl ether so that the cured films prepared therefrom contained a ratio of cellulose ester to plasticizer of 1:3. The cured films were clear and slightly rubbery and formed soft medical capsules of good quality. The capsules were susceptible to quick dissolving by water.

Liquid-filled soft capsules may be formed from sheets of elastic material as referred to herein, for example by the process described in U. S. Patent No. 2,219,578 of Pittenger, dated October 29, 1940.

We claim:
1. A medical capsule essentially consisting of a container of a lower fatty acid ester of cellulose having an acyl content of 13–20% having contained therein a medical substance.
2. A medical capsule essentially consisting of a container of a lower fatty acid ester of cellulose having an acyl content of 13–20% and 0–25% of a compatible plasticizer, the capsule having contained therein a medical substance.
3. A medical capsule essentially consisting of a container of a lower fatty acid ester of cellulose having an acyl content of 13–20% plasticized with 50–400% based on the cellulose ester of a plasticizer compatible therewith, the capsule having contained therein a medical substance.
4. A medical capsule essentially consisting of a container of a lower fatty acid ester of cellulose having an acyl content of 13–20% plasticized with a glycerol ether compatible therewith, the capsule having contained therein a medical substance.
5. A medical capsule essentially consisting of a container of cellulose acetate having an acetyl content of 13–20% having contained therein a medical substance.
6. A medical capsule essentially consisting of a container of cellulose acetate having an acetyl content of 13–20% and 0–25% of a compatible plasticizer, the capsule having contained therein a medical substance.
7. A medical capsule essentially consisting of a container of cellulose acetate having an acetyl content of 13–20% plasticized with 50–400% based on the cellulose ester of a plasticizer compatible therewith, the capsule having contained therein a medical substance.
8. A medical capsule essentially consisting of a container of cellulose acetate having an acetyl content of 13–20% plasticized with a glycerol ether compatible therewith, the capsule having contained therein a medical substance.
9. A medical capsule essentially consisting of a container of cellulose acetate having an acetyl content of 13–20% plasticized with glycerol, the capsule having contained therein a medical substance.

GORDON D. HIATT.
JOHN EMERSON.

Certificate of Correction

Patent No. 2,349,430.  May 23, 1944.

GORDON D. HIATT ET AL.

It is hereby certified that errors appear in the printed specification of the above numbered patent requiring correction as follows: Page 2, first column, line 69, for "60%" read *6%*; and second column, line 73, for "glyceryl-β-methyl-β-phenyl" read *glyceryl-α-methyl-α-phenyl*; and that the said Letters Patent should be read with these corrections therein that the same may conform to the record of the case in the Patent Office.

Signed and sealed this 25th day of July, A. D. 1944.

[SEAL]

LESLIE FRAZER,
*Acting Commissioner of Patents.*